Sept. 6, 1960

A. M. STEFFEN 2,951,918

AUTOMATIC SELECTOR FOR TELEVISION

Filed July 16, 1956

ARNOLD M. STEFFEN,
*INVENTOR.*

HUEBNER, BEEHLER,
WORREL & HERZIG,
ATTORNEYS.

BY Albert M. Herzig

United States Patent Office 2,951,918

Patented Sept. 6, 1960

2,951,918

AUTOMATIC SELECTOR FOR TELEVISION

Arnold M. Steffen, 5302 Don Pio Drive, Woodland Hills, Calif.

Filed July 16, 1956, Ser. No. 598,193

2 Claims. (Cl. 200—37)

Figures 1, 2:
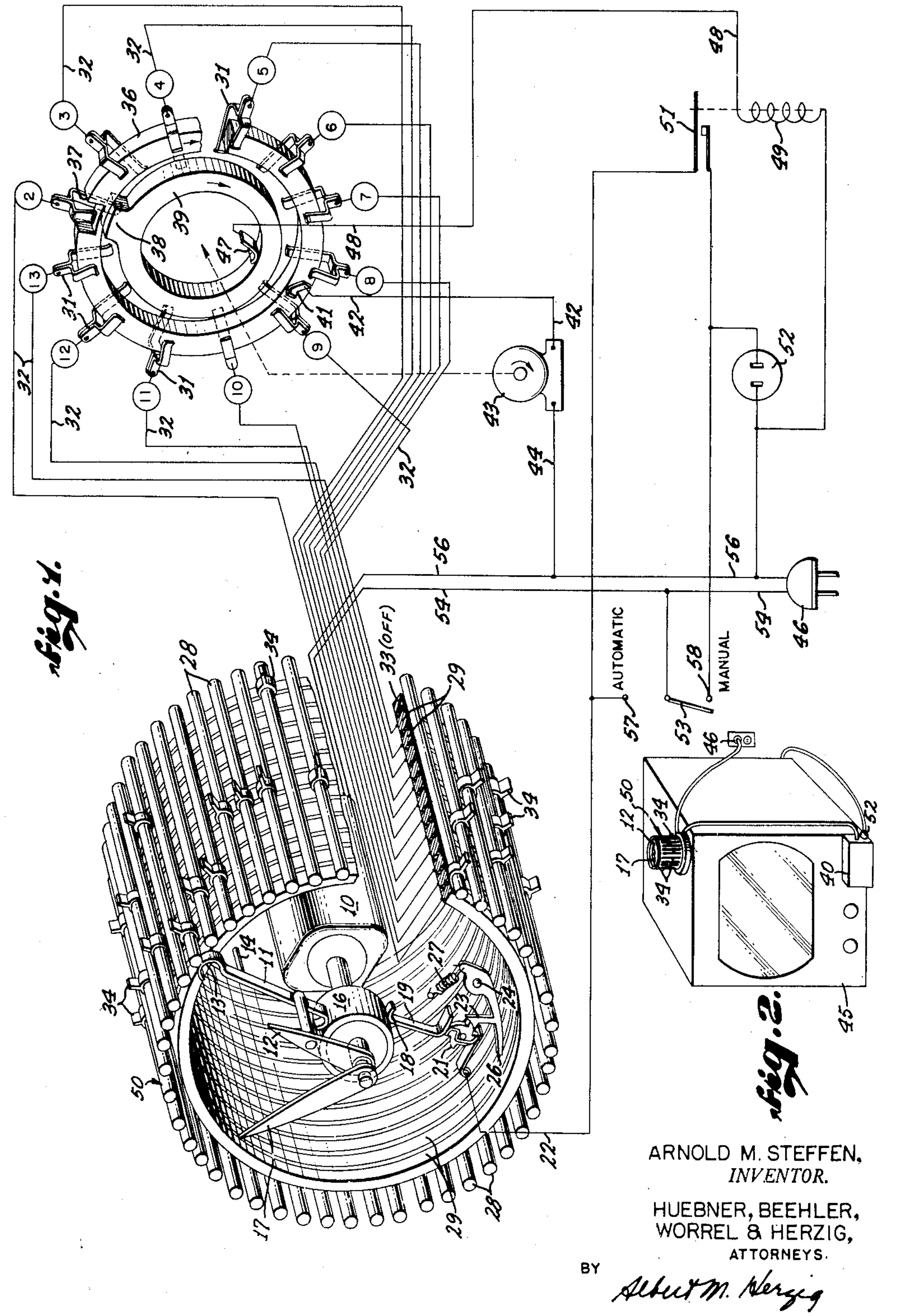

This invention relates to an automatic television channel selector, and particularly to an electrically operated channel selector which will automatically operate and control a television set in accordance with a preset television program.

It is frequently desirable to preselect a television program and to have the television set switch automatically from one channel to another to show the selected program over a period of several hours at a time. An automatic selector switch of this type would amount to a foolproof method of assurance that one's favorite programs would not be missed by forgetfulness or inattention to the time of day. Such selectors also would permit parents to set television programs in advance for small children and thus free the parents for the rest of the day from interruptions caused by the necessity of repeatedly switching the television set channel selector.

In entertaining a group of people by television, it often is desirable to select a program in advance so that it will not be necessary for an attendant to periodically switch from one television channel to another to present to the group audience the desired selected television programs. This is especially true where a group audience, such as guests, are being entertained under circumstances where it is necessary to avoid controversy as to the programs to be viewed, or to avoid frequent switching of the television controls during the course of each program as it is being shown.

Controversies generally can be avoided by publishing a printed program schedule in advance and by automatically presetting the television channel selector in accordance with such a program. In this manner, the guests in the audience can determine in advance which of the scheduled programs they desire to view, and can plan their attendance or absence from the television room accordingly. The occasion for controversy or argument as to which program is to be shown also is absent when an automatic channel selector is in operation and no attendant periodically appears at the controls of the television set.

It also is desirable to employ a television channel selector or programmer to avoid the necessity of having an attendant periodically interrupt his normal operations or duties to spend time at the television controls for the purpose of switching channels and following instructions or suggestions from the audience as to which programs to play and which not to play. The mechanism of such a television channel selector can be enclosed in a housing and locked, if desired, so that there will be no invitation to change the chosen program to be shown over a period of time in the future. An automatic television channel selector would certainly be helpful in such places as restaurants, hotel lobbies, barber shops, television dealers display windows and salesroom floors, clubrooms, sickrooms, and hospitals for invalids and shut-ins, to name a few.

Accordingly, it is an important object of my invention to provide an automatic television channel selector which can be set to show a television program automatically for a desired period of time in the future.

Another object is to provide such a television channel selector of compact and economic construction capable of being conveniently installed on conventional, mass-produced television sets.

A further object is to provide an automatic television channel selector which can be conveniently installed on conventional makes and models of television sets, and can be conveniety set to show a preselected television program.

Additional objects will become apparent from the following description.

In general terms, my invention comprehends the provision of an automatic television channel selector comprising channel contact setting means for setting a channel sequence and channel electric contact times for a future television program. Switching means are associated with the setting means for switching to and from channels in accordance with the channel sequence and contact times of the program set on the setting means. Clock means are associated with the setting means for distributing electric current through the setting means to the switching means, and a voltage source is connected to the clock means for supplying the electric current.

A more detailed description of a specific embodiment of my invention is given with reference to the drawing, wherein:

Figure 1 is a diagrammatic view showing a specific embodiment of my invention; and Figure 2 is a schematic view showing an embodiment of the invention mounted on a television set.

A clock 10, which is shown to be an electric clock, but may be a mechanical clock, is provided with a contact hand 11. A 12-hour clock is shown, but it will be understood that a 24-hour clock can also be used. The contact hand can take the place of the regular hand 12 of the clock, or it may be connected to the regular hand. The outer end of the contact hand is provided with a suitable spring contact 13 and a striker rod 14. The inner ends of the hands 11 and 12 are fastened to an electric contact ring 16, which is turned by the clock at the speed of one revolution in twelve hours. The minute hand of the clock is indicated at 17.

A brush 18 is made to contact the ring 16 during rotation of the latter. The brush is connected to a conductor 19, which in turn contacts one of the points of a 12-hour cycle switch 21. This switch is incorporated in the standard 12-hour clock but is not included when a 24-hour clock is used. The switch 21 contains four points. Two opposed points are connected electrically and the other two opposed points are insulated from each other. When the switch is in the position shown, electrical contact is established between conductors 12 and 22, and when it is rotated a quarter turn from the position shown, electric contact is broken between these conductors.

A pawl 23 is pivotally mounted at 24 on a trigger 26. The pawl also is yieldably mounted on the trigger. The trigger is connected at its inner end to a coil spring 27 so that the outer end of the trigger and pawl 23 normally are urged outward. When striker 14, moving in a clockwise direction engages the trigger 26, the outer end of the trigger and the pawl are urged inwardly against the tension in spring 27. The pawl is brought into engagement with an adjacent point of switch 21 and is yieldably urged over the point, which is shaped to function as a ratchet point. The pawl then hooks over the point of the spring. When the striker 14 slips off the outer end of trigger 26, the tension of spring 27 causes the pawl to turn the switch 21 a quarter turn and either makes or breaks contact between conductors 12 and 22.

Around the face of the clock are arranged rod conductors 28. These conductors are arranged in spaced parallel cylindrical configuration. They are equally spaced so that four rods occupy an arc equivalent to one hour on the face of the clock. The spring contact 13 is made so that it contacts each one of the rods 28 for a period of fifteen minutes as the contact hand 11 is moved around the face of the clock at the speed of the hour hand 12.

A second group of conductors 29 having a circular shape, and spaced inwardly from the conductors 28, is arranged so that the conductors are in spaced parallel concentric arrangement coaxially with the face of the clock 10. The conductors 29 are not in electrical contact with conductors 28, and they can be mounted on the outside of a cylindrical insulator. Each of the conductors 29 is connected respectively to one of the twelve channel contact points 31 through a connecting wire 32, as indicated. A circular insulator 33 is included with the conductors 29 for the purpose of shutting off the television set, if desired, at any intervals during the course of the period of the program.

Contact clips 34 are movable and slide along conductor rods 28 at points along the rods to establish electrical contact between a rod 28 and a circular conductor 29 at a point of intersection between the two conductors, as shown. The positioning of clips 34 relative to the points of intersection of the two sets of conductors determines the sequence of the channels contacted and the length of time each channel is electrically contacted through its channel contact point 31.

The channel contact points 31 are mounted circularly around a circular switching conductor 36 to make sliding electrical contact with the switching conductor. The switching conductor 36 is notched at 37 so that it makes electrical contact at all times with all but one of the channel contact points. That is, the channel contact point that happens to be in alignment with the notch 37, is the only point of the group of twelve channel contact points that is not in contact with the conductor 36 at a given time; the other eleven contact points are.

The particular channel contact point that is in alignment with notch 37 also is in alignment with a projection 38 on an inner circular switching conductor 39 mounted concentrically with conductor 36. In other words, only the channel contact point that is disconnected from conductor 36 makes electrical contact with conductor 39 at a given time. The other contact points are disconnected from conductor 39 at that time. Conductors 36 and 39 are rotatably mounted to rotate together and to maintain a fixed relationship with each other so that notch 37 is at all times in alignment with projection 38.

A brush 41 is mounted to make sliding electrical contact with the inner periphery of conductor 36 and is electrically connected by a wire 42 to a motor 43. The motor is connected to a voltage source through a wire 44 and a plug 46. When electric current flows to a channel contact point 31 other than the one aligned with notch 37, the motor 43 is energized by current flowing through the motor from the voltage source through switching conductor 36, brush 41 and wire 42. This causes the motor to turn in a given direction, as indicated by the arrow.

The shaft of the motor 43 is connected to the switching conductors 36 and 39 and causes them to turn together in the same direction. The switching conductors may be mounted directly on the shaft of the motor for compactness. The motor and the conductors continue to turn until the notch 37 comes into alignment with the particular channel contact point 31 that happens at the time to be connected to the voltage source. When this occurs, that channel contact point breaks contact with switching conductor 36 and motor 43 and conductors 36 and 39 stop turning.

Current then flows through inner switching conductor 39 through a brush 47 making contact with the inner periphery of the conductor. This current flow continues as long as notch 37 and projection 38 are in alignment with a channel contact point. From brush 47 the current flows through a wire 48 and a holding relay 49. The current energizes relay 49 and the relay closes a switch 51. Closing of switch 51 causes current to flow through a television set plugged in receptacle 52 if single pole, double throw switch 53 is closed for automatic operation.

The motor mechanism including motor 43, which rotates switching conductors 36 and 39, simultaneously rotates the tuning shaft of the television set. This preferably is accomplished by coupling the motor 43 directly to the tuning shaft. The motor housing unit 40 preferably is mounted on the outside of the cabinet 45, as shown in Figure 2. Alternatively, it may be mounted on the inside of the cabinet, or the motor mechanism may be incorporated into the television set at the factory in any suitable manner.

The channel selector unit 50 preferably is located on the outside of the cabinet, as shown in Figure 2, for convenience in setting the clips 34, and the cycle switch 21 when a 12-hour clock is used. Clock 10 together with the two sets of conductors 28 and 29, and switch 53 preferably are combined in one channel selector unit 50. Switching conductors 36 and 39, plug 46, receptacle 52, holding relay 49, motor 43, including auxiliary linking mechanism establishing a connection to the television tuning shaft, preferably are combined in the motor housing unit 40. As pointed out above, switching conductors 36 and 39 rotate simultaneously with motor 43 and the television set tuning shaft.

The drawing shows a compact arrangement wherein the electric clock motor is connected to the plug 46 through leads 54 and 56. The television receptacle 52 also is connected to plug 46. This arrangement eliminates the necessity of separate plugs for the clock, television set and channel selector. The relay 49, switch 51 and the motor 43 can be compactly mounted inside a relatively small housing.

The television automatic channel selector can be rapidly and conveniently set by placing a contact clip 34 on a rod conductor 28 at the point of intersection of the rod by the circular conductor 29 connected to the particular channel contact point 31 corresponding to the channel that it is desired to have turned on for the particular quarter hour covered by the particular rod conductor. If it is desired to play that same channel for a half hour, another clip 34 is placed on the next rod conductor 28 in a clockwise direction but in contact with the same circular conductor 29 contacted by the previous clip 34. This is repeated the desired number of times, if it is desired to play the same channel continuously for three-fourths of an hour, an hour, etc.

If a different channel is desired, the next clip 34 is placed on the next rod conductor 28 in contact with the circular conductor 29 connected to the channel that it is desired to play during the time covered by that particular rod conductor. In this manner, a television program of any desired time duration, up to twelve hours, is preset. If it is desired that the television set be shut off for any particular time, or times, falling inside the over-all program period, this can be done by placing a clip or clips 34 on a rod, or rods, 28 corresponding to that time, or those times, in contact with the circular insulator 33. This will turn off the set for timed periods of time by shutting off the flow of current to holding relay 49 for such periods of time.

After the clips 34 have been placed, the 12-hour cycle switch 21 is moved counterclockwise to start the running of the preset television program. The cycle switch is moved past the striker bar 14 to trip the switch 21 to the "on" position and the single pole, double throw switch 53 is turned to contact the "automatic" pole 57. Electric current from the voltage source of plug 46 then passes through conductor 22, cycle switch 21, conductor 19, brush 18, ring 16, contact hand 11, spring contact 13, a rod conductor 28, contacted by the spring contact, a clip 34 on that rod conductor, a circular conductor 29 contacted by that clip and into the channel contact point 31 connected to that circular conductor by a wire 32.

If that particular channel contact point is not in alignment with notch 37 of switching conductor 36, current will flow through conductor 36, brush 41, wire 42 and motor 43. This will cause motor 43 to turn switching conductor 36 until notch 37 comes into alignment with that particular, energized channel contact point. When that happens, current is shut off from switching conductor 36, and is switched into inner switching conductor 39. From conductor 39 current flows through brush 47, wire 48 and holding relay 49. Energized holding relay 49 closes switch 51. This completes a circuit for current to flow from plug 46 through the television set plugged into receptacle 52, through switch 51, automatic contact point 57 and into the channel contact point 31 aligned with notch 37, by way of cycle switch 21 and the path previously described.

The television set will operate on that particular channel for the next quarter hour. At the end of the quarter hour, spring contact 13 switches to the next rod conductor 28 in the clockwise direction. If that rod conductor is connected to the same circular conductor 29 (by a clip 34), as was the previous rod conductor, the television set continues to operate on the same channel on which it operated during the previous quarter hour period. If, however, that rod conductor is connected to a different circular conductor 29, current will flow to a different channel contact point, that is, one not in alignment with the notch 37. This will energize motor 43 and cause switching conductor 36 to turn until the misaligned, energized channel contact point is aligned with notch 37, in the manner described above. The desired, different channel will then be switched on for the desired period of time.

When a rod conductor 28 is reached that is connected by a clip 34 to circular insulator 33, no current reaches either motor 43 or holding relay 49. Switching conductors 36 and 39 remain stationary and switch 51 opens to shut off the flow of current through the television set. Thus the set is shut off for the desired number of quarter-hour periods until a rod conductor 28 is reached which is connected to a circular conductor 29 instead of circular insulator 33. The switching operation described above then goes into effect again. The television set can be placed on "manual" by switching to contact point 58. This cuts off the "automatic" channel selector circuits.

It will be observed that at the end of twelve hours, when using a 12-hour clock, the television set will be automatically shut off for twelve hours and will again be automatically turned on by the cycle switch 21 to repeat the same program sequence previously set, unless changes are made in the program setting. This arrangement assures a shut-down of the television set for twelve hours at night in case the viewer falls asleep. Automatic start-up of the set also reminds anyone in its vicinity that a new program period is commencing.

The cycle switch 21 provides for adjustment at any time during a twelve-hour program period. That is, it may be set to operate from, say 2:00 a.m. to 2:00 p.m., noon to midnight, 3:15 p.m. to 3:15 a.m. etc. It is adjustable with relation to the face of the clock or with relation to the positioning of the clips 34, which themselves are graduated in 15-minute intervals. The adjusting lever for the cycle switch 21 is adjustable in a counterclockwise direction to engage striker 14 at the desired time.

The hour hand 12 and contact hand 11 carrying striker 14 rotate clockwise and cycle switch 21 is adjustable in a counterclockwise direction. The adjusting means of the cycle switch can be located in the center of the clock dial, or, as shown, along the edge of the clock dial where the time markings are. Other locations of the cycle switch, such as in the base of the unit, may also be employed, if desired. When a 24-hour clock is used instead of a 12-hour clock, a twelve hour cycle switch is not required. However, 96 clips 34 and conductors 28 are used instead of the 48 of each employed with the 12-hour clock. A full 24-hour day's programming can be set for one revolution of the 24-hour clock. The sequence of the programming previously set on the 24-hour clock selector is repeated during consecutive revolutions of the hour hand of the clock unless changes in the positioning of the contact clips are made.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claim so as to embrace any and all equivalent structure.

Having described my invention, what I claim as new and desire to secure by Letters Patent is:

1. An automatic selector comprising, a first group of spaced parallel conductors arranged to define longitudinal elements of the surface of a cylinder, a second group of axially spaced circular conductors arranged concentrically to the axis of said cylinder and spaced radially inwardly from the conductors of said first group and between the ends thereof, a member slidably mounted on each conductor of said first group for selectively establishing electrical connection between said conductor and any selected conductor of said second group, a clock means in said cylinder, a rotary contactor driven by said clock means about the axis of said cylinder to sequentially engage the conductors of said first group, and circuit means for conducting electrical energy to said rotary contactor, said circuit means including a control switch mechanism in a fixed position in the path of movement of a portion of said rotary contactor, said switch mechanism being arranged to be successively engaged and opened and then closed by said rotary contactor on successive rotations thereof whereby said rotary contactor is sequentially energized and de-energized during successive cycles of rotation.

2. A selector as defined in claim 1 wherein said switch mechanism is mounted for selective angular adjustment about the axis of said cylinder to change the fixed position thereof whereby a cycle of rotation of said rotary contactor may be set to start at any desired time.

References Cited in the file of this patent

UNITED STATES PATENTS

| | | |
|---|---|---|
| 2,045,251 | Raber | June 23, 1936 |
| 2,187,373 | Cheney | Jan. 16, 1940 |
| 2,195,642 | De Larm | Apr. 2, 1940 |
| 2,389,990 | Magnusson | Nov. 27, 1945 |
| 2,432,540 | Owens | Dec. 16, 1947 |
| 2,541,257 | Judd | Feb. 13, 1951 |
| 2,545,055 | Switzer | Mar. 13, 1951 |
| 2,636,981 | Benow | Apr. 28, 1953 |
| 2,650,272 | Gavigan | Aug. 25, 1953 |
| 2,755,424 | Papitto | July 17, 1956 |
| 2,805,331 | Wolford | Sept. 3, 1957 |